Patented Dec. 18, 1934

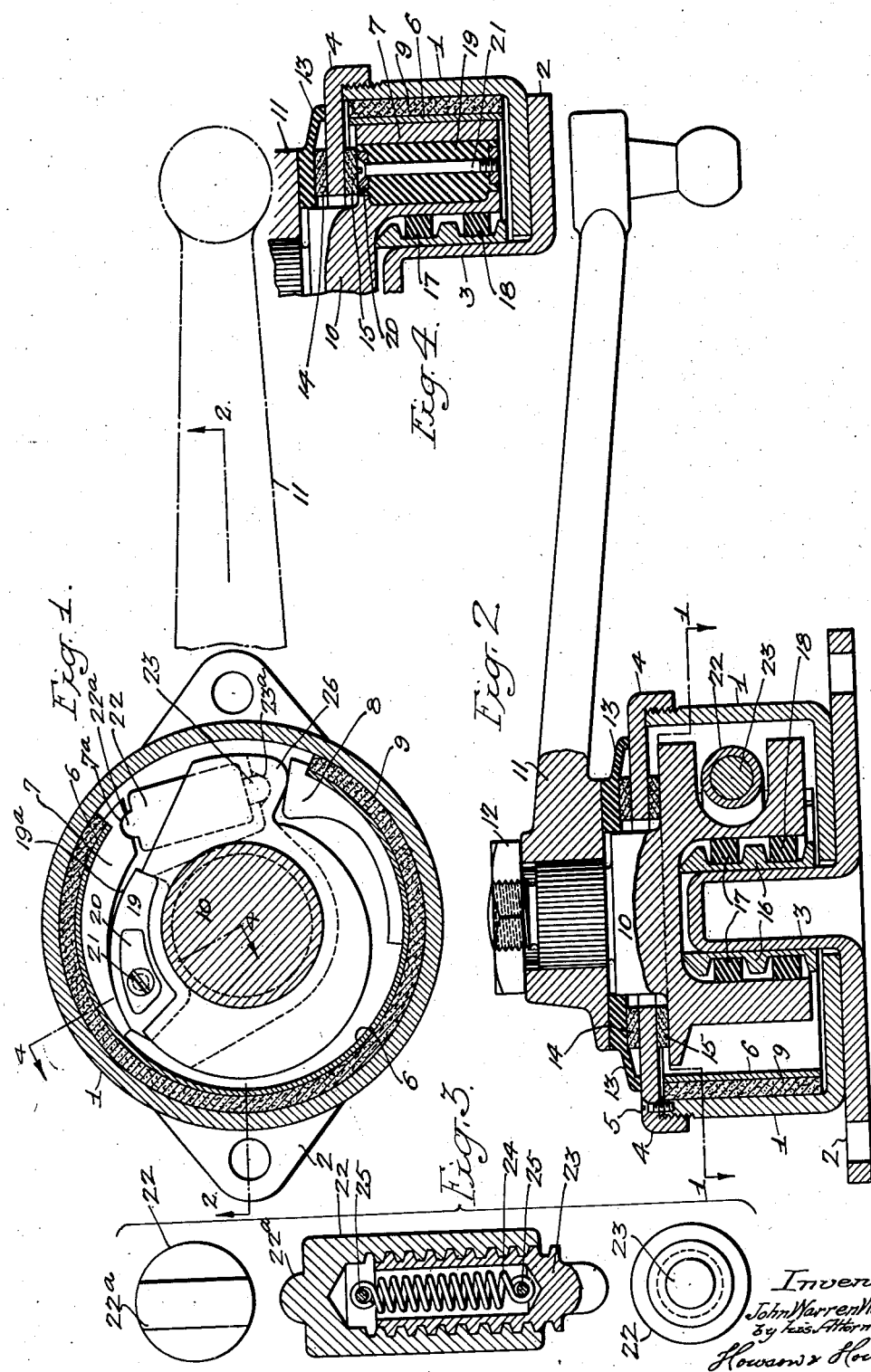

1,985,122

UNITED STATES PATENT OFFICE 1,985,122

SHOCK ABSORBER

John Warren Watson, Wayne, Pa., assignor to John Warren Watson Company, Philadelphia, Pa., a corporation of Pennsylvania Application July 2, 1932, Serial No. 620,665

19 Claims. (Cl. 188—130)

This invention relates particularly to shock absorbers for motor cars or other vehicles in which it is desired to control the relative movements between axle and frame.

One object of this invention is to provide greater resistance to the movement of separation between the frame and axle than to their movement of approach.

A particular object is to provide a variable resistance to the separating movement of frame and axle according to the speed of such movement of separation, the resistance increasing with the speed.

A further object is to provide a control for this increase of resistance.

A further object is to provide a limit for this increase of resistance in order to avoid any possibility of the shock absorber becoming jammed or locked under any conditions of operation.

A further object is to provide a variable resistance to the movement of approach of frame and axle according to the speed of such movement, the resistance decreasing with the speed.

A further object is to provide a control for this decrease of resistance.

A further object is to provide a limit for this decrease of resistance.

A further object is to provide means for manually adjusting the resistance provided by the shock absorber to suit it to different loads or duties.

A further object is to provide means to automatically and instantly compensate for wear which may take place in service.

One embodiment of my invention is shown in the accompanying drawing in which:

Figure 1 is a sectional view on line 1—1, Fig. 2;

Fig. 2 is a sectional view on line 2—2, Fig. 1;

Fig. 3 shows a section and end views of the wear-compensating device which is shown merely in outline in Figs. 1 and 2, and Fig. 4 is a partial sectional view along line 4—4, Fig. 1.

Referring to Figs. 1 and 2, part 1 is a cylindrical drum member or housing. 2 is a base member carrying a boss portion 3. This boss projection is seen only in Fig. 2. Parts 1 and 2 are fastened together by welding or other suitable means. 4 is a cover member screwed in place on the drum. Set screw 5 keeps the cover from working loose. Member 6 is a resilient brake band formed to a larger diameter causing it to constantly press outwardly toward the inside of drum member 1. Attached to this band are end members 7 and 8. Also attached to the flexible or resilient brake band is flexible member 9 of brake lining or other suitable material as will be referred to later on in this specification. These parts 6, 7, 8 and 9 which make up the brake band assembly are held together by the conventional use of rivets, not shown. Member 10 is a floating impeller or shaft having an outwardly-extending serrated boss to which is attached, in conventional shock absorber manner, the operating arm 11 which is held in place by nut 12. Member 13 of soft rubber, which is held in compressed form between members 11 and 14, acts as a seal to keep weather and dirt from entering the shock absorber. Members 14 and 15 are rings of suitable wear-resisting material which act as further seals against the entry of water and dirt and also as guides for holding the impeller member in substantial alignment with the shock absorber housing. Rotatably fitted around boss portion 3 of member 2 is a bushing member 16 having a plurality of annular grooves. In these grooves are carried soft rubber members 17 and 18 which snugly engage the base of the grooves and also the walls of the central circular cavity in the impeller member 10. Impeller member 10 is also provided with a shallow cavity on its side into which is placed a soft rubber member 19 which, for a portion of its length, snugly bears against end member 7. This rubber member runs substantially the full width of the impeller member and hence has a broad bearing against end member 7. On each side of this rubber member are plates 20. A long screw 21 goes through a hole in rubber member 19 and through the two plates 20 for the purpose of drawing these plates together and causing the rubber to flatten out to provide more or less pressure, as may be desired, between it and the impeller and end member 7. This means for deforming the rubber member 19 constitutes the manually adjustable means already mentioned. Member 22 into which is internally threaded member 23, together with coiled torsion spring 24, shown in Fig. 3, which is wound to screw these two members apart, constitutes the automatic compensating means already mentioned. Spring 24 at its two ends is fastened respectively to members 22 and 23 by pins 25. This compensating unit by reason of its ever-lengthening tendency maintains itself in position between end member 7 and the small socket 23a formed in impeller member 10. Member 22 is provided with a ridge 22a, and end member 7 is provided with a groove 7a, for holding the compensating unit in alignment with the brake band assembly.

The device operates as follows, the shock absorber being attached to the frame of the vehicle and the arm 11 being connected with the axle of the vehicle:

When the arm is moved upward as when the frame and axle approach each other, the impeller 10 is rotated in a counterclockwise direction. This rotation causes the impeller socket portion 23a to push against the wear-compensating unit 22—23 which in turn pushes against and revolves the brake band assembly against the resistance between it and the drum. Pushing against this resistance causes the impeller member to fulcrum downwardly about the socket 23a as a center thereby lessening its pressure against rubber member 19 which in turn exerts a lessened pressure against end member 7, this downward fulcruming movement being permitted by the compressibility of soft rubber rings 17 and 18. If the arm is moved slowly, this fulcruming downward and lessening of the pressure against end member 7 is very slight as this downward fulcruming movement is resisted by the rubber rings 17 and 18. Accordingly, however, as the speed of rotation in this direction is increased the downward fulcruming against rubber members 17 and 18 will correspondingly increase, which results in a corresponding decrease in the pressure exerted by rubber member 19 against end member 7. This lessening of the pressure between rubber member 19 and end member 7 will cease when rubber members 17 and 18 have been compressed to the point where the wall of the impeller cavity comes in contact with the ridges on bushing 16, thus putting a limit to the amount of decreased resistance to this direction of movement.

On the reverse or clockwise movement, when resisting the separation of frame and axle, a greatly increased resistance is produced. In this direction of movement, the nose portion 26 of impeller member 10 bears against end member 8 which, acting as a fulcrum, elevates the main body of impeller member 10, causing it to push against rubber member 19, which in turn increases its push against end member 7. In this direction, therefore, practically the full length of the brake band assembly is caused to be expanded or to flood out against the inside of drum member 1 with greater pressure than is set up by the normal expansion of resilient band member 6. In this direction of movement, it will be readily understood that progressively faster movements will cause progressively greater upward fulcruming, and will hence cause progressively greater pressure of rubber member 19 against end member 7. This upward fulcruming, however, is controlled by the compression resistance of rubber rings 17 and 18 and finally will be stopped when the impeller cavity comes in contact with the ridges on bushing 16. Any desired degree of resistance change for different speeds of movement in either direction may be provided according to the size or density of rubber rings 17 and 18 and/or by the diameter of the bushing ridges with relation to the diameter of the impeller cavity. Normally these parts would be so proportioned as to make very rare any possible contact between the cavity wall and the bushing ridges. Thus, the entire control of resistance in either direction of movement will be accomplished without metal to metal abutment, and hence without noise.

In addition to the increasing of pressure and hence increasing of resistance in the clockwise direction as just described, a further increase, with increasing speeds and increasing fulcruming, is provided by the curved face 19a of rubber member 19 which bears against end member 7. It will be readily understood that as the fulcruming in the upward direction increases, rubber member 19 will be caused to contact with end member 7 more and more toward the end of end member 7, and thus cause more and more of the length of the band assembly to be brought into play under high pressure. A further aid to the effectiveness of all of the foregoing described provisions for increasing pressures in the clockwise direction, is accomplished by the creeping or, probably better stated, slight relative movement which is necessary between the impeller member and end member 7 which must take place during the fulcruming action in order to permit unrestricted flooding or expansion of the band assembly against the drum. This slight relative movement or "creep" is perfectly provided by reason of the conformability of member 19. Because member 19 is made of rubber, it readily yields to the slight but necessary creep, and thus makes impossible any drag or sticking to interfere with smooth action and desired flooding.

Any wear which may take place between the band assembly and the drum, which wear would cause an increase in the gap between end members 7 and 8, or any wear which might take place at the fulcruming points, will automatically and instantly be compensated for by the ever-present tendency of spring 24 to unwind and thus screw out member 23 from member 22 thereby lengthening the wear-compensating unit. The threads on members 22 and 23 are of such inclination as to prevent the relative rotation of these parts by reason of any endwise pressure.

This embodiment of my invention being a device completely enclosed, permits the use of a powdered material for providing the lubrication or, rather, frictioning properties necessary between the drum member 1 and the liner member 9. Being completely enclosed, the device may be well filled with suitable frictioning material suitably powdered to work in and form a film between the drum and liner member and thus provide for satisfactorily long periods of usage, without re-filling, the required lubrication and resistance to the relative movement of these members.

The art of using powdered material for this purpose is already well known, calcium stearate and powdered material having a ceramic base embodying calcium stearate having been used for many years in the manufacture and servicing of shock absorbers well known on the market. The manufacturer of these shock absorbers since 1924 has supplied and sold these lubricating and frictioning powders in canister packages to its dealer organization throughout the world and to others for use in servicing its shock absorbers and also for use in connection with motor car brakes to impart to them smoother friction qualities and to eliminate noises. Both the calcium stearate per se. and the ceramic material comprising the calcium stearate are described in U. S. Patents Nos. 1,845,056 and 1,845,096 granted to Robert F. Nowalk on February 16, 1932. This general use of the frictioning powders for servicing these shock absorbers was made necessary by reason of the fact that the shock absorbers above referred to were of the strap-operated type and hence were not completely enclosed and hence could not retain a sufficient quantity of powder to serve for long periods of use. Additional quantities of these frictioning materials were carried in these non-enclosed instruments in the form of pressed inserts which were placed in holes moulded for the purpose in the liner members.

No claims for invention in the use of powdered material for supplying a lubricating or frictioning film or element is made in this application because, as above noted, this use of lubricating or frictioning powders is already old to the shock absorber art, and to simply increase the quantity of powder as is made possible in a device which is enclosed and hence which is able to retain the greater quantity would not appear to involve invention particularly as the smaller quantity of powder creates an operating film between the drum and the band just as effectively as does the larger quantity except for a shorter period of time.

While the use of the above powders is well suited to the present embodiment of my invention because the device is completely enclosed, I prefer, because of the rather stiff expansion of the brake band assembly toward the drum in this particular embodiment, to use a vulcanized liner of material comprising rubber and calcium stearate as described in U. S. Patent No. 1,845,858 granted to Watson and Redfield on February 16, 1932. This particular material in the form of the liner proper provides in this case a more certain presence of the frictioning ingredients at the working surfaces.

Having thus illustrated and described one embodiment of my invention, what I claim and desire to protect by Letters Patent of the United States is:

1. In a shock absorber, the combination of a friction drum and a relatively movable split friction band extending around the greater portion of the periphery of said drum, means for causing pressure between said drum and band and floatingly mounted means adapted to exert radial pressure against said band adjacent one end thereof, to increase the pressure between said members accordingly as the force to relatively move them is increased.

2. In a shock absorber, the combination of a friction drum and a relatively movable split friction band, means for causing pressure between said drum and band and floatingly mounted means adapted to exert circumferential pressure against and adjacent to one end of said band and radial pressure against and adjacent to the other end of said band to increase the pressure between said drum and band accordingly as the force to relatively move them is increased.

3. In a shock absorber, the combination of a friction drum and a relatively movable split friction band extending around the greater portion of the periphery of said drum, means for causing pressure between said drum and band and floatingly mounted means adapted to exert circumferential pressure against and adjacent to one end of said band and radial pressure against and adjacent to the other end of said band to increase the pressure between said drum and band accordingly as the force to relatively move them is increased.

4. In a shock absorber, the combination of a friction drum and a relatively movable split friction band, means for causing pressure between said drum and band, floatingly mounted means adapted to increase the pressure between said drum and band accordingly as the force to relatively move them is increased, and restraining means to control the rate of increase of pressure with relation to the increase of the force.

5. In a shock absorber, the combination of a friction drum and a relatively movable split friction band, means for causing pressure between said drum and band, floatingly mounted means adapted to increase the pressure between said drum and band accordingly as the force to relatively move them is increased, and means to fix a limit to the increase of pressure.

6. In a shock absorber, the combination of a friction drum and a relatively movable split friction band, means for causing pressure between said drum and band, floatingly mounted means adapted to increase the pressure between said drum and band accordingly as the force to relatively move them is increased, restraining means to control the rate of increase of pressure with relation to the increase of the force, and means to fix a limit to the increase of pressure.

7. In a shock absorber, the combination of a friction drum and a relatively movable split friction band, means for causing pressure between said drum and band, floatingly mounted means adapted to increase the pressure between said drum and band accordingly as the force to relatively move them is increased, and means carried by said floatingly mounted means to still further increase the pressure between said drum and band accordingly as the force to relatively move them is increased.

8. In a shock absorber, the combination of a friction drum and a relatively movable split friction band, means for causing pressure between said drum and band, floatingly mounted means adapted to increase the pressure between said drum and band accordingly as the force to relatively move them is increased, means carried by said floatingly mounted means to still further increase the pressure between said drum and band accordingly as the force to relatively move them is increased and restraining means to control the rate of increase of pressure with relation to the increase of the force.

9. In a shock absorber, the combination of a friction drum and a relatively movable split friction band, means for causing pressure between said drum and band, floatingly mounted means adapted to increase the pressure between said drum and band accordingly as the force to relatively move them is increased, means carried by said floatingly mounted means to still further increase the pressure between said drum and band accordingly as the force to relatively move them is increased, and means to fix a limit to the increase of pressure.

10. In a shock absorber, the combination of a friction drum and a relatively movable split friction band, means for causing pressure between said drum and band, floatingly mounted means adapted to increase the pressure between said drum and band accordingly as the force to relatively move them is increased, means carried by said floatingly mounted means to still further increase the pressure between said drum and band accordingly as the force to relatively move them is increased, restraining means to control the rate of increase of pressure with relation to the increase of the force, and means to fix a limit to the increase of pressure.

11. In a shock absorber, the combination of a housing member, a member operable therein and extending therethrough, a seal between said two members to prevent water from entering the housing, said seal comprising a wear resisting member movable with relation to one of said members and a resilient member held compressed between said wear resisting member and one of said first mentioned members.

12. In a shock absorber, the combination of a housing member, a member operable therein and extending therethrough, a seal between said two members to prevent water from entering the housing, said seal comprising a wear resisting member movable with relation to one of said members and a soft rubber member held compressed between said wear resisting member and one of said first mentioned members.

13. In a shock absorber, the combination of a friction drum and a relatively movable split friction band, means for causing pressure between said drum and band, floatingly mounted means adapted to increase the pressure between said drum and band accordingly as the force to relatively move them is increased, and automatic wedge irreversible wear-compensating means to take up lash which would be caused by wear of the parts.

14. In a shock absorber, the combination of a friction drum and a relatively movable friction band, means for causing pressure between said drum and band, floatingly mounted means adapted to decrease the pressure between said drum and band accordingly as the force to relatively move them is increased in velocity, and restraining means to control the rate of decrease of pressure with relation to the increase of the force.

15. In a shock absorber, the combination of a friction drum and a relatively movable friction band, means for causing pressure between said drum and band, floatingly mounted means adapted to decrease the pressure between said drum and band accordingly as the force to relatively move them is increased, and means to fix a limit to the decrease of pressure.

16. In a shock absorber, the combination of a friction drum and a relatively movable friction band, means for causing pressure between said drum and band, floatingly mounted means adapted to decrease the pressure between said drum and band accordingly as the force to relatively move them is increased, restraining means to control the rate of decrease of pressure with relation to the increase of the force, and means to fix a limit to the decrease of pressure.

17. In a shock absorber, the combination of a friction drum and a relatively movable friction band, means for causing pressure between said drum and band, floatingly mounted means adapted to exert radial pressure against said band adjacent one end thereof for causing additional pressure between said drum and said friction band, and means to decrease said pressure caused by said floatingly mounted means accordingly as the force to relatively move the members is increased.

18. In a shock absorber, the combination of a friction drum and relatively movable friction means extending around the greater portion of the periphery of said drum, means for causing pressure between said drum and said friction means, and floatingly mounted means adapted to move radially against said friction means to increase the pressure between said drum and said friction means accordingly as the force to relatively move them is increased.

19. In a shock absorber, the combination of a friction drum and relatively movable friction means extending around the greater portion of the periphery of said drum, means for causing pressure between said drum and said friction means, and floatingly mounted means adapted to move both circumferentially and radially against said friction means to increase the pressure between said drum and said friction means accordingly as the force to relatively move them is increased.

JOHN WARREN WATSON.